Figure 1:
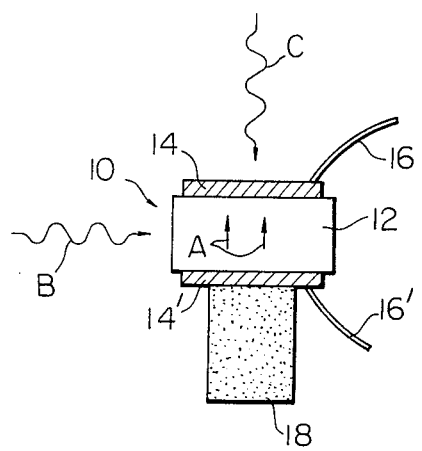

United States Patent [19]

Yamaka et al.

[11] 3,773,564
[45] Nov. 20, 1973

[54] LEAD TITANATE PYROELECTRIC INFRA-RED INTENSITY DETECTOR

[75] Inventors: Eiso Yamaka; Ichiro Ueda, both of Kadoma City, Japan

[73] Assignee: Matsushita Electric Indusrial Company, Limited, Kadoma City, Osaka, Japan

[22] Filed: Mar. 17, 1972

[21] Appl. No.: 235,649

[30] Foreign Application Priority Data
Mar. 19, 1971 Japan.............................. 46/15901

[52] U.S. Cl.................. 136/213, 136/236, 136/238, 136/239, 250/83.3 H, 252/520, 252/521
[51] Int. Cl............................................. H01v 3/00
[58] Field of Search.................. 136/238, 239, 236, 136/206, 213; 250/83.3 H; 252/520, 521

[56] References Cited
UNITED STATES PATENTS

| | | |
|---|---|---|
| 2,985,700 | 5/1961 | Johnston.............................. 136/239 |
| 3,673,119 | 6/1972 | Ueoka et al. ........................ 252/520 |
| 3,511,991 | 5/1970 | Beerman........................... 250/83.3 H |
| 3,453,432 | 7/1969 | McHenry....................... 136/213 UX |
| 3,458,363 | 7/1969 | Precht................................. 136/238 |

Primary Examiner—Carl D. Quarforth
Assistant Examiner—E. A. Miller
Attorney—John Lezdey et al.

[57] ABSTRACT

An infra-red intensity detector which comprises a polarized ceramic substrate composed of $PbTiO_3$, $MnO_2$ of from 0.8 to 1.2 mol percent of $PbTiO_3$, and $La_2O_3$ of from 1.0 to 2.0 mol percent of $PbTiO_3$, and at least one couple of electrodes connected to the ceramic substrate and disposed in the direction of polarization of the substrate.

1 Claim, 2 Drawing Figures

Patented Nov. 20, 1973 3,773,564

LEAD TITANATE PYROELECTRIC INFRA-RED INTENSITY DETECTOR

This invention relates to infra-red intensity detectors and, more particularly, to an infra-red intensity detector utilizing pyroelectricity.

An infra-red intensity detector sensitive to infra-red rays is useful for detecting relatively low temperature or temperature distribution of a surface of a material from a position remote from the surface of the material since the surface of the material of relatively low temperature radiates infra-red rays residing in a spectrum where a peak value locates at a wavelength of about 10 microns.

Various infra-red detectors sensitive to infra-red rays have been developed, one of which is of photoconductive type such as a germanium infra-red detector. This type detector has an excellent sensitivity and a high responsiveness, although this type detector is disadvantageous in that the detector is workable merely in a limited wavelength range and operative only at a low ambient temperature. Another infra-red detector is a thermistor bolometer. Although thermistor bolometer is workable in wide wavelength range and operative at a high ambient temperature, the thermistor bolometer should be, in operation, impressed by a bias voltage ± 100 to 300 V. Still another infra-red detector is of pyroelectric type utilizing pyroelectric crystal which are spontaneously polarized in dependence on temperature variation of the crystal caused by infra-red rays irradiated thereto. The pyroelectric infra-red intensity detector is workable in a wide wavelength range and is operative at an either low or high temperature without any bias voltage. It is known in the art that the pyroelectric effect takes place in the following crystals: barium titanate, lithium sulfate, Rochelle salt ($KNaC_4H_4O_6$), lead titanate zirconnate, tri-glycine sulfate (TGS), lithium niobate ($LiNbO_3$), SKL ($Sr_4KLiNb_{10}O_3$), and SBN ($Sr_xBa_{1-x}Nb_2O_6$). Heretofore, the TGS, $LiNbO_3$ and SBN have often been used for the infra-red detectors.

In this instance, it is to be noted that a pyroelectric crystal to be used for an infra-red intensity detector should be discussed from the following view points:

1. Detectivity ($D^*$)

Detectivity $D^*$ of a pyroelectric crystal is represented by a reciprocal of such an intensity of infra-red rays incident upon the crystal as to cause a pyroelectric signal having an intensity equal to that of noise produced in the crystal to appear in the crystal. The demension of the Detectivity is expressed by cm. $\sqrt{Hz}/W$.

2. Formability

Formability of a pyroelectric crystal generally governs mass-productivity and prodution cost thereof. It is desired that the crystal to be used for the infra-red detector is readily formed into a small wafer of about 1 × 1 × 0.02 $mm^3$ in volume through cutting or polishing treatment. It is further desired that electrodes for picking-up pyroelectric effect is readily adhered onto the surface of the crystal.

3. Curie temperature (Tc)

Since the spontaneous polarization in the pyroelectric crystal might be possible only below the Curie temperature, the pyroelectric detector should be used below the Curie temperature. Therefore, it is desirable that a pyroelectric crystal to be used for an infra-red intensity detector has a high Curie temperature.

4. Temperature coefficient of the spontaneous polarization (dPs/dT)

Temperature coefficient of spontaneous polarization of a pyroelectric crystal governs sensitivity of the device including the crystal.

TGS, $LiNbO_3$, and SBN crystals will be discussed from the above-mentioned view points in the following description.

1. tri-glycine sulfate (TGS)

Since tri-glycine sulfate crystal is so brittle that it may be difficult to form the crystal into a desired shape. Furthermore, since tri-glycine sulfate crystal is soluble in water, the crystal is susceptible to moisture in the atmosphere. Therefore, the crystals should be in fabrication protected from influence of the moisture in the ambient air and the device should be provided with a shield case for containing the crystal therein.

Furthermore, since the glicinium sulfate crystal has such a low Curie temperature as 50°C, the detector using the crystal is operative merely at from 30° to 40°C.

2. lithium niobate ($LiNbO_3$)

Although lithium niobate crystal has a preferred formability and high Curie temperature, the crystal has poor detectivity $D^*$ even if the crystal is a single crystalline.

3. SBN ($Sr_xBa_{1-x}Nb_2O_6$)

It is difficult to obtain a high quality single crystalline of SBN. Although the SBN crystal has a preferred detectivity $D^*$, the crystal has a low Curie temperature. It is further difficult to polarize the SBN crystal in one direction.

Being apparent from the above-description, the conventional pyroelectric infra-red detectors using above-mentioned crystals are not fully acceptable.

It is therefore an object of the present invention to provide an improved pyroelectric infra-red intensity detector.

It is another object to provide an infra-red intensity detector having a sufficiently large detectivity $D^*$.

It is still another object to provide an infra-red intensity detector having a preferred formability.

It is a further object to provide an infra-red intensity detector having a high Curie temperature.

It is a still further object to provide an infra-red intensity detector which is readily fablicated through a mass-productive process.

Figure 2:
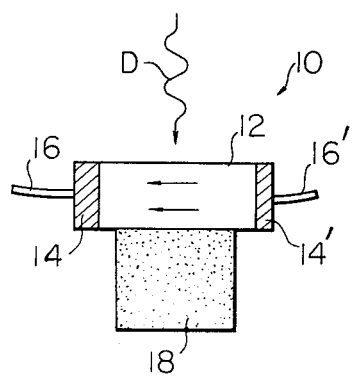

Further and another objects of the invention will be more clearly apparent by reference to the following description, taken in conjunction with the accompanying drawing in which:

FIGS. 1 and 2 are sectional views of preferred embodiments of the present invention.

Corresponding numerals of reference designate like elements in the views.

An infra-red intensity detector according to the present invention utilizes a polarized ceramic substrate composed of $PbTiO_3$, $MnO_2$ of 0.2 mol percent of the $PbTiO_3$ and $La_2O_3$ of 1.0 to 2.0 mol percent of the $PbTiO_3$. It is apparent from the following Table that the pyroelectric material according to the invention has a characteristic superior to those of the conventional pyroelectric material.

TABLE

| Material | Curie temperature (°C) | $D^*\left(cm.\sqrt{Hz/W}\right)$ | $\frac{dPs}{dT}\left(\frac{Coul.\,cm.}{Cal}\right)$ | Formability |
|---|---|---|---|---|
| TGS | 52 | 6×10⁵ | 3.5×10⁻² | Poor, soluble in water. |
| LiNbO₃ | 1,190 | 2×10⁵ | 0.6×10⁻³ | |
| SBN | 130 | 2.5×10⁵ | 6×10⁻³ | |
| PbTiO₃ plus MnO₂ and La₂O₃ ceramic | 470 | 9.5×10⁵ | 6×10⁻³ | Excellent. |

Referring now to FIG. 1, there is illustrated an embodiment of an infra-red intensity detector according to the invention, which comprises a infra-red sensitive element 10 including a pyroelectric polarized ceramic substrate 12 composed of $PbTiO_3$, $MnO_2$ of 0.8 to 1.2 mol percent of $PbTiO_3$, and $La_2O_3$ of 1.0 to 2.0 mol percent of $PbTiO_3$. The substrate 12 is polarized in a direction indicated by arrows A. A pair of electrodes 14 and 14' made of, for example, gold nichrome or aluminium are formed on both the major surface of the substrate 12 through a suitable process such as vacuum evaporation. In this instance, it is necessary to align the electrodes 14 and 14' in the direction of polarization of the substrate 12. A pair of lead wires 16 and 16' are connected to the electrodes 14 and 14', respectively, for the sake of picking-up of variation of the polarization as an electric signal. The infra-red sensitive element 10 is mounted through, for example, the electrode 14' on a support member 18 which is in turn secured to an inner wall of a housing (not shown) of the detector so as to block heat transfer from the infra-red sensitive element 10 to the housing.

When, in operation, infra-red rays are irradiated onto the surface of the substrate 12 as shown by an arrow B, the polarization of the substrate 12 is varied in dependence on the intensity of the irradiated infra-red rays. The variation of the polarization is picked-up through the electrodes 14 and 14' and lead wires 16 and 16' as an electric signal which is sensed by, for example, a voltage meter. When the electrode 14 is made so thin as to permit infra-red rays to permeate therethrough, the infra-red sensitive element 10 can detect infra-red rays incident on the electrode 14 as shown by an arrow C.

In FIG. 2, another embodiment of the infra-red intensity detector of the invention is illustrated, which is constructed identically to that of FIG. 1, except that the substrate 12 is mounted on the support member 18. This detector is sensitive to infra-red rays incident to the substrate as shown by an arrow D.

A preferred method of making the substrate 12 will explained hereinafter.

A mixture of PbO and $TiO_2$ equimolecular to PbO is first prepared. The mixture is then mixed through a wet mixing process with $MnO_2$ of 0.8 to 1.2 mol percent of $PbTiO_3$, and $La_2O_3$ of 1.0 to 2.0 mol percent of $PbTiO_3$. Thereafter, the resultant mixture is calcined at about 850°C. The thus calcined mixture is then pulverized into a fine powder. The fine powder is formed into pellet or disk shape and sintered at a temperature from 1240° to 1280°C in the air during about 1 hour. The resultant ceramics are dipped in a silicon oil bath of 200°C where an electric field $f$ of about 60 KV/cm is established, so that, the ceramics are polarized. The polarized ceramics are formed into a desired shape.

It is apparent from the foregoing description that the infra-red detector according to this invention is advantageous in its high detectivity $D^*$ and Curie temperature. Furthermore, the infra-red detector has excellent formability.

It will be understood that the invention is not to be limited to the exact construction shown and described and that various changes and modifications may be made without departing from the spirit and scope of the invention, as defined in the appended claims.

What is claimed is:

1. An infra-red intensity detector comprising a polarized ceramic substrate consisting of a mixture of $PbTiO_3$, $MnO_2$ in an amount from 0.8 to 1.2 mol percent of said $PbTiO_3$, and $La_2O_3$ in an amount from 1.0 to 2.0 mol percent of said $PbTiO_3$, and a pair of electrodes connected to opposite sides of said ceramic substrate, said electrodes being provided in the direction of polarization of said substrate.

* * * * *